US012585510B2

(12) United States Patent
Goyal et al.

(10) Patent No.: US 12,585,510 B2
(45) Date of Patent: Mar. 24, 2026

(54) METHOD AND SYSTEM FOR AUTOMATED EVENT MANAGEMENT

(71) Applicant: JPMorgan Chase Bank, N.A., New York, NY (US)

(72) Inventors: Rasik Goyal, Newark, DE (US); Sanjay Durgadin, Hockessin (DE); Raushon Kumar, Hockessin (DE); Elisabeth Kozack, New York, NY (US); Zachary R Warman, Wheaton, IL (US); Tushar Mishra, Bear, DE (US); Selvakumar Dharmaraj, Wilmington, DE (US); Jitendra Kumar Pandey, Wilmington, DE (US); Mike Forest, Tampa, FL (US); Umesh Sawant, Plano, TX (US); Kevin Bolan, New York, NY (US); Dharani Manjunath, Lewis Center, OH (US); Diana L Castro Cook, Sunbury, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 436 days.

(21) Appl. No.: 18/206,295

(22) Filed: Jun. 6, 2023

(65) Prior Publication Data

US 2024/0411620 A1 Dec. 12, 2024

(51) Int. Cl.
*G06F 9/54* (2006.01)

(52) U.S. Cl.
CPC .............. *G06F 9/542* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 9,025,742 B1 * | 5/2015 | Cantu, II | ............ | H04M 3/5238 |
| | | | | 379/215.01 |
| 2007/0083463 A1 * | 4/2007 | Kraft | ...................... | G06Q 40/02 |
| | | | | 705/38 |
| 2010/0161467 A1 * | 6/2010 | Ageenko | ................ | G06Q 40/00 |
| | | | | 705/35 |
| 2014/0025491 A1 * | 1/2014 | Nagarajan | .......... | G06Q 30/0255 |
| | | | | 705/14.64 |

(Continued)

FOREIGN PATENT DOCUMENTS

WO     WO-2011059840 A2 *   5/2011   ........... G06Q 10/109

*Primary Examiner* — Charles E Anya
(74) *Attorney, Agent, or Firm* — GREENBLUM & BERNSTEIN, P.L.C.

(57) ABSTRACT

A method for providing an extensible architecture to facilitate automated event management is disclosed. The method includes receiving an indication that relates to an occurrence of a first event, the indication including event data; parsing the event data to generate event messages that correspond to the first event, each of the event messages relating to a structured data set that is accessible within a network environment; applying, by using the at least one event message, a rule and a corresponding trigger to accounts that are associated with the first event; initiating resolution actions for each of the accounts based on the rule and the corresponding trigger; and modifying a resolution indicator that is associated with each of the accounts based on results of the resolution actions.

20 Claims, 7 Drawing Sheets

400

(56) References Cited

U.S. PATENT DOCUMENTS

| | | | |
|---|---|---|---|
| 2015/0234806 A1* | 8/2015 | Bhagwan | G06F 40/279 |
| | | | 705/7.18 |
| 2016/0021171 A1* | 1/2016 | Zourzouvillys | H04L 69/40 |
| | | | 709/207 |
| 2016/0314528 A1* | 10/2016 | Abbott | G06Q 30/0269 |
| 2017/0076379 A1* | 3/2017 | Wadley | G06Q 50/01 |
| 2017/0177722 A1* | 6/2017 | Cavalin | G06N 20/00 |
| 2017/0301048 A1* | 10/2017 | Turek | G06Q 10/10 |
| 2018/0164959 A1* | 6/2018 | Gupta | G06F 3/04817 |
| 2020/0272758 A1* | 8/2020 | Gardner | G06Q 50/186 |
| 2021/0027302 A1* | 1/2021 | Resheff | G06N 5/01 |
| 2021/0090191 A1* | 3/2021 | Chan | G16H 40/67 |
| 2021/0374585 A1* | 12/2021 | Ramanathan | G06Q 40/06 |

* cited by examiner

100

102

300

202

206(1)

204(1)

Automated Event
Management and
Analytics Module

302

Business Event
Messages Repository

210

Customer Accounts
Database

206(2)

210

208(2)

208(1)

400

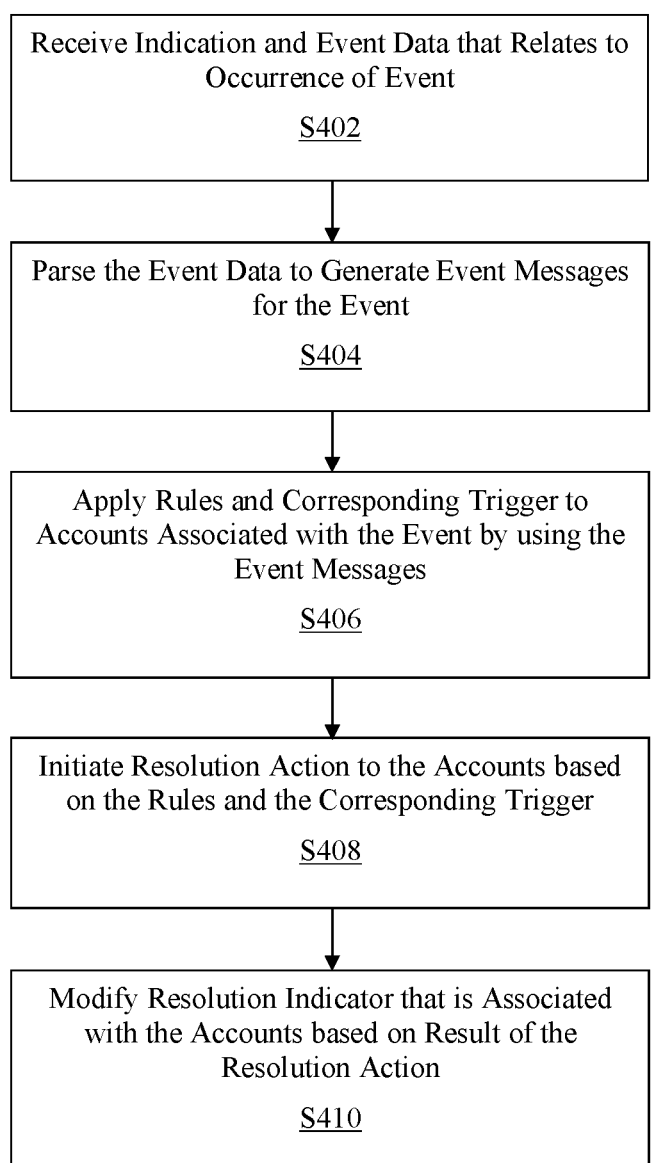

Receive Indication and Event Data that Relates to
Occurrence of Event

S402

Parse the Event Data to Generate Event Messages
for the Event

S404

Apply Rules and Corresponding Trigger to
Accounts Associated with the Event by using the
Event Messages

S406

Initiate Resolution Action to the Accounts based
on the Rules and the Corresponding Trigger

S408

Modify Resolution Indicator that is Associated
with the Accounts based on Result of the
Resolution Action

METHOD AND SYSTEM FOR AUTOMATED EVENT MANAGEMENT

BACKGROUND

1. Field of the Disclosure

This technology generally relates to methods and systems for managing events, and more particularly to methods and systems for providing an extensible architecture pattern that leverages data ingestion, data processing, and data resolution to facilitate automated event management.

2. Background Information

Many business entities provide services and products that are essential tools for many customers. Often, the usability of these essential tools may be drastically affected by occurrence of various customer life events. Historically, implementations of conventional event management techniques have resulted in varying degrees of success with respect to resource efficient identification and resolution of the events for the customers.

One drawback of the conventional event management techniques is that in many instances, disparate solutions for managing the events are individually implemented across a range of similar services and products. As a result, resources may not be efficiently utilized to identify and resolve events due to duplication of effort. Additionally, because of the disparate solutions, quality of event data across the range of similar services and products may not be consistently ensured.

Therefore, there is a need for an extensible architecture pattern that automatically leverages data ingestion, data processing, as well as data resolution to proactively and systemically manage events across various services and products.

SUMMARY

The present disclosure, through one or more of its various aspects, embodiments, and/or specific features or sub-components, provides, inter alia, various systems, servers, devices, methods, media, programs, and platforms for providing an extensible architecture pattern that leverages data ingestion, data processing, and data resolution to facilitate automated event management.

According to an aspect of the present disclosure, a method for providing an extensible architecture to facilitate automated event management is disclosed. The method is implemented by at least one processor. The method may include receiving at least one indication that relates to an occurrence of a first event, the at least one indication may include event data; parsing the event data to generate at least one event message that corresponds to the first event, each of the at least one event message may relate to a structured data set that is accessible within a network environment; applying, by using the at least one event message, at least one rule and a corresponding trigger to at least one account that is associated with the first event; initiating at least one resolution action for each of the at least one account based on the at least one rule and the corresponding trigger; and modifying at least one resolution indicator that is associated with each of the at least one account based on a result of the at least one resolution action.

In accordance with an exemplary embodiment, the method may further include identifying at least one service that is associated with each of the at least one account; determining at least one requirement for each of the at least one account based on the at least one resolution indicator, each of the at least one requirement may relate to a regulatory obligation; and initiating at least one service resolution action for each of the at least one service based on the corresponding at least one requirement.

In accordance with an exemplary embodiment, to receive the at least one indication, the method may further include generating a graphical user interface to receive event information, the graphical user interface may include at least one graphical element that is configured to receive an input from a user; displaying the graphical user interface via a user device; and receiving the at least one indication via the graphical user interface.

In accordance with an exemplary embodiment, the method may further include determining that additional event information is required based on the at least one indication and a corresponding event type; modifying the graphical user interface to request the additional event information; and displaying the modified graphical user interface via the user device.

In accordance with an exemplary embodiment, the method may further include aggregating raw data from a plurality of sources; parsing, by using at least one model, the raw data to automatically identify a second event; and generating a second indication that relates to the second event, the second indication may include second event data.

In accordance with an exemplary embodiment, the at least one model may include at least one from among a machine learning model, natural language processing model, a statistical model, a mathematical model, a process model, and a data model.

In accordance with an exemplary embodiment, to parse the event data, the method may further include aggregating authoritative information from a plurality of sources; verifying the event data based on a comparison with the corresponding authoritative information; and generating the at least one event message by using the verified event data.

In accordance with an exemplary embodiment, the modifying of the at least one resolution indicator may include at least one from among a first action to add the at least one resolution indicator based on a context of the first event and a second action to remove the at least one resolution indicator based on the context of the first event.

In accordance with an exemplary embodiment, the structured data set may correspond to a predetermined data structure that is universally defined for usage by at least one component of the network environment.

According to an aspect of the present disclosure, a computing device configured to implement an execution of a method for providing an extensible architecture to facilitate automated event management is disclosed. The computing device including a processor; a memory; and a communication interface coupled to each of the processor and the memory, wherein the processor may be configured to receive at least one indication that relates to an occurrence of a first event, the at least one indication may include event data; parse the event data to generate at least one event message that corresponds to the first event, each of the at least one event message may relate to a structured data set that is accessible within a network environment; apply, by using the at least one event message, at least one rule and a corresponding trigger to at least one account that is associated with the first event; initiate at least one resolution action for each of the at least one account based on the at least one rule and the corresponding trigger; and modify at least one resolution indicator that is associated with each of the at least one account based on a result of the at least one resolution action.

In accordance with an exemplary embodiment, the processor may be further configured to identify at least one service that is associated with each of the at least one account; determine at least one requirement for each of the at least one account based on the at least one resolution indicator, each of the at least one requirement may relate to a regulatory obligation; and initiate at least one service resolution action for each of the at least one service based on the corresponding at least one requirement.

In accordance with an exemplary embodiment, to receive the at least one indication, the processor may be further configured to generate a graphical user interface to receive event information, the graphical user interface may include at least one graphical element that is configured to receive an input from a user; display the graphical user interface via a user device; and receive the at least one indication via the graphical user interface.

In accordance with an exemplary embodiment, the processor may be further configured to determine that additional event information is required based on the at least one indication and a corresponding event type; modify the graphical user interface to request the additional event information; and display the modified graphical user interface via the user device.

In accordance with an exemplary embodiment, the processor may be further configured to aggregate raw data from a plurality of sources; parse, by using at least one model, the raw data to automatically identify a second event; and generate a second indication that relates to the second event, the second indication including second event data.

In accordance with an exemplary embodiment, the at least one model may include at least one from among a machine learning model, natural language processing model, a statistical model, a mathematical model, a process model, and a data model.

In accordance with an exemplary embodiment, to parse the event data, the processor may be further configured to aggregate authoritative information from a plurality of sources; verify the event data based on a comparison with the corresponding authoritative information; and generate the at least one event message by using the verified event data.

In accordance with an exemplary embodiment, the modifying of the at least one resolution indicator may include at least one from among a first action to add the at least one resolution indicator based on a context of the first event and a second action to remove the at least one resolution indicator based on the context of the first event.

In accordance with an exemplary embodiment, the structured data set may correspond to a predetermined data structure that is universally defined for usage by at least one component of the network environment.

According to an aspect of the present disclosure, a non-transitory computer readable storage medium storing instructions for providing an extensible architecture to facilitate automated event management is disclosed. The storage medium including executable code which, when executed by a processor, may cause the processor to receive at least one indication that relates to an occurrence of a first event, the at least one indication may include event data; parse the event data to generate at least one event message that corresponds to the first event, each of the at least one event message may relate to a structured data set that is accessible within a network environment; apply, by using the at least one event message, at least one rule and a corresponding trigger to at least one account that is associated with the first event; initiate at least one resolution action for each of the at least one account based on the at least one rule and the corresponding trigger; and modify at least one resolution indicator that is associated with each of the at least one account based on a result of the at least one resolution action.

In accordance with an exemplary embodiment, when executed by the processor, the executable code may further cause the processor to identify at least one service that is associated with each of the at least one account; determine at least one requirement for each of the at least one account based on the at least one resolution indicator, each of the at least one requirement may relate to a regulatory obligation; and initiate at least one service resolution action for each of the at least one service based on the corresponding at least one requirement.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for providing an extensible architecture pattern that leverages data ingestion, data processing, and data resolution to facilitate automated event management.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
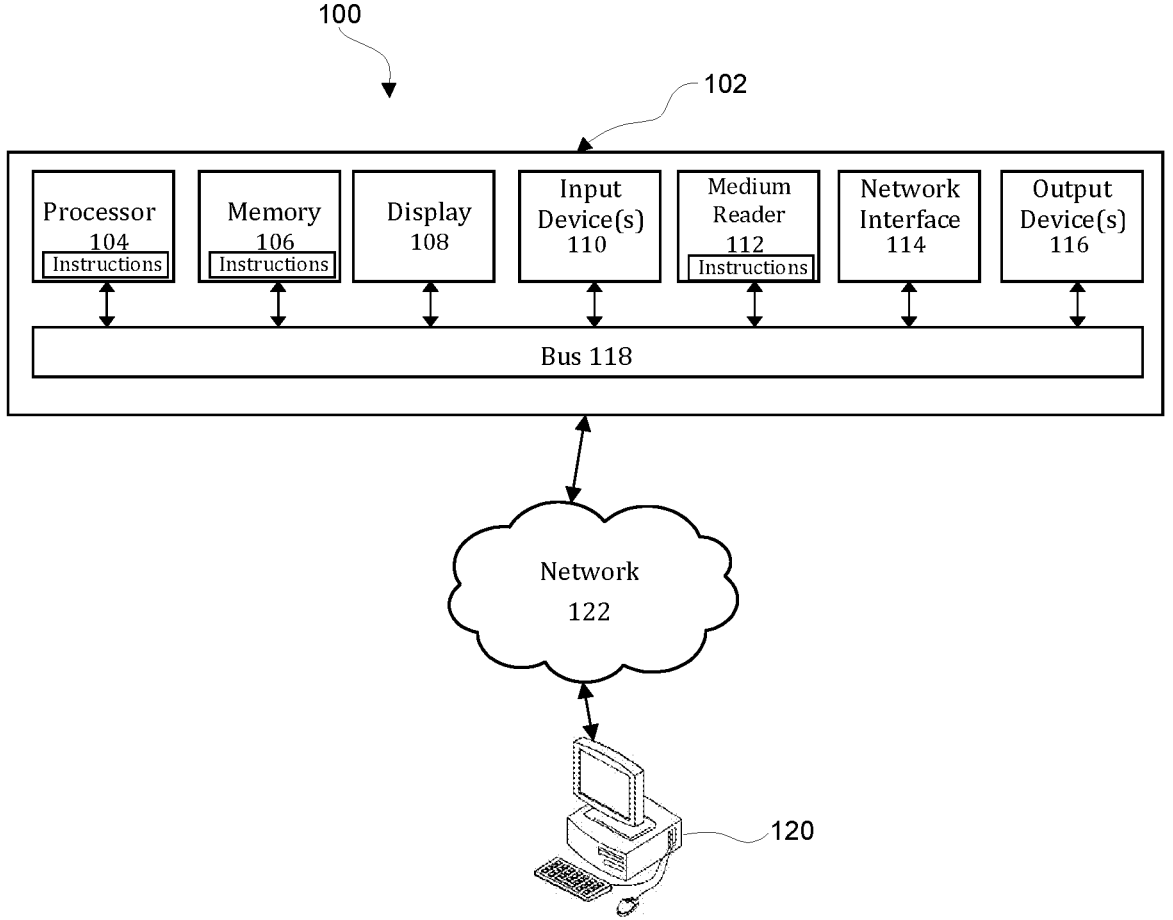
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an extensible architecture pattern that leverages data ingestion, data processing, and data resolution to facilitate automated event management.

Figure 2:
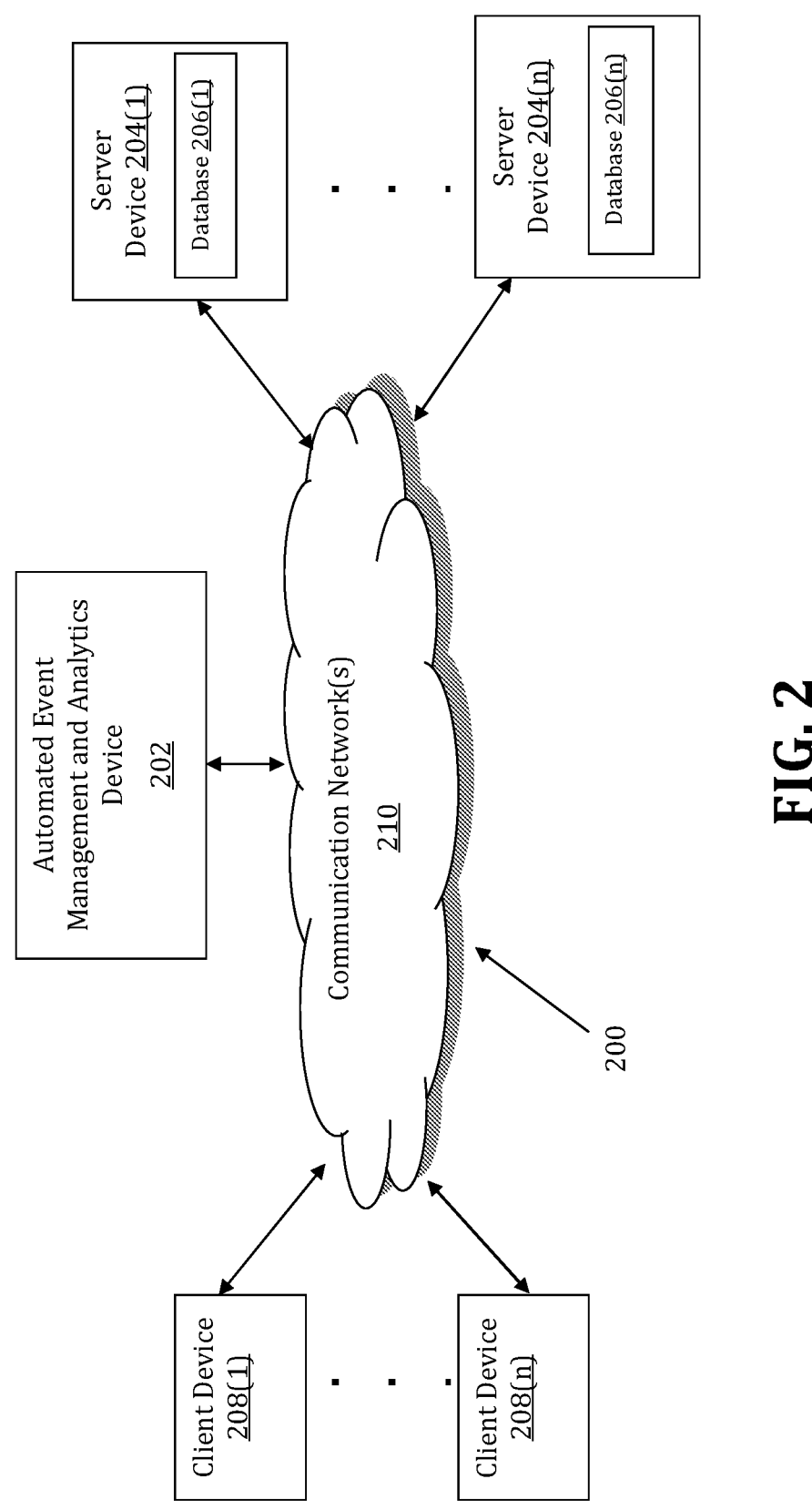
FIG. 2 illustrates an exemplary diagram of a network environment.

Referring to FIG. 2, a schematic of an exemplary network environment 200 for implementing a method for providing an extensible architecture pattern that leverages data ingestion, data processing, and data resolution to facilitate automated event management is illustrated. In an exemplary embodiment, the method is executable on any networked computer platform, such as, for example, a personal computer (PC).

The method for providing an extensible architecture pattern that leverages data ingestion, data processing, and data resolution to facilitate automated event management may be implemented by an Automated Event Management and Analytics (AEMA) device 202. The AEMA device 202 may be the same or similar to the computer system 102 as described with respect to FIG. 1. The AEMA device 202 may store one or more applications that can include executable instructions that, when executed by the AEMA device 202, cause the AEMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AEMA device 202 itself, may be located in virtual server(s) running in a cloud-based computing environment rather than being tied to one or more specific physical network computing devices. Also, the application(s) may be running in one or more virtual machines (VMs) executing on the AEMA device 202. Additionally, in one or more embodiments of this technology, virtual machine(s) running on the AEMA device 202 may be managed or supervised by a hypervisor.

In the network environment 200 of FIG. 2, the AEMA device 202 is coupled to a plurality of server devices 204(1)-204(n) that hosts a plurality of databases 206(1)-206(n), and also to a plurality of client devices 208(1)-208(n) via communication network(s) 210. A communication interface of the AEMA device 202, such as the network interface 114 of the computer system 102 of FIG. 1, operatively couples and communicates between the AEMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AEMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AEMA devices that efficiently implement a method for providing an extensible architecture pattern that leverages data ingestion, data processing, and data resolution to facilitate automated event management.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AEMA device 202 may be a standalone device or integrated with one or more other devices or apparatuses, such as one or more of the server devices 204(1)-204(n), for example. In one particular example, the AEMA device 202 may include or be hosted by one of the server devices 204(1)-204(n), and other arrangements are also possible. Moreover, one or more of the devices of the AEMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AEMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to indications, events, event data, event messages, structured data sets, rules, triggers, resolution actions, resolution indicators, services, requirements, regulatory obligations, and service resolution actions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AEMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AEMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AEMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AEMA device 202, the server devices 204(1)-204(n), or the client devices 208(1)-208(n), for example, may be configured to operate as virtual instances on the same physical machine. In other words, one or more of the AEMA device 202, the server devices 204(1)-204(n), or the client devices 208(1)-208(n) may operate on the same physical device rather than as separate devices communicating through communication network(s) 210. Additionally, there may be more or fewer AEMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
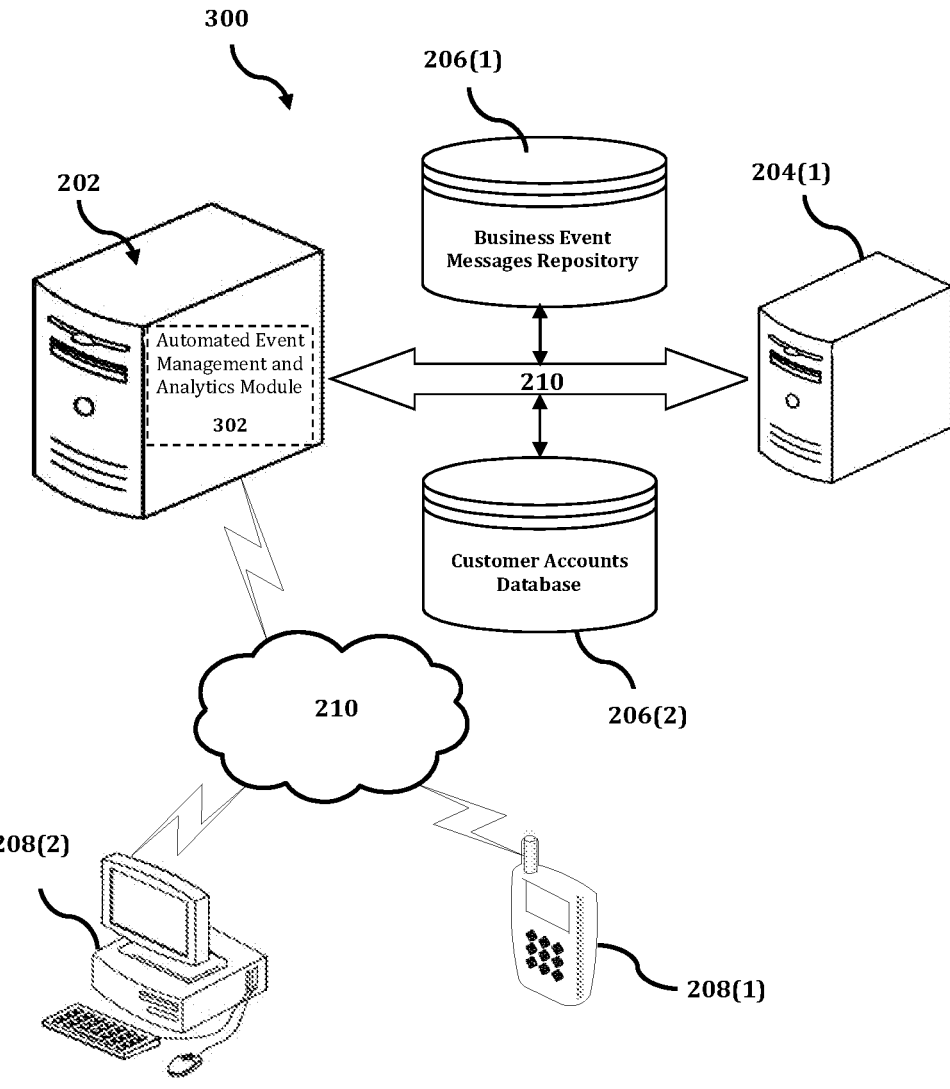
FIG. 3 shows an exemplary system for implementing a method for providing an extensible architecture pattern that leverages data ingestion, data processing, and data resolution to facilitate automated event management.

The AEMA device 202 is described and shown in FIG. 3 as including an automated event management and analytics module 302, although it may include other rules, policies, modules, databases, or applications, for example. As will be described below, the automated event management and analytics module 302 is configured to implement a method for providing an extensible architecture pattern that leverages data ingestion, data processing, and data resolution to facilitate automated event management.

An exemplary process 300 for implementing a mechanism for providing an extensible architecture pattern that leverages data ingestion, data processing, and data resolution to facilitate automated event management by utilizing the network environment of FIG. 2 is shown as being executed in FIG. 3. Specifically, a first client device 208(1) and a second client device 208(2) are illustrated as being in communication with AEMA device 202. In this regard, the first client device 208(1) and the second client device 208(2) may be "clients" of the AEMA device 202 and are described herein as such. Nevertheless, it is to be known and understood that the first client device 208(1) and/or the second client device 208(2) need not necessarily be "clients" of the AEMA device 202, or any entity described in association therewith herein. Any additional or alternative relationship may exist between either or both of the first client device 208(1) and the second client device 208(2) and the AEMA device 202, or no relationship may exist.

Further, AEMA device 202 is illustrated as being able to access a business event messages repository 206(1) and a customer accounts database 206(2). The automated event management and analytics module 302 may be configured to access these databases for implementing a method for providing an extensible architecture pattern that leverages data ingestion, data processing, and data resolution to facilitate automated event management.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AEMA device 202 via broadband or cellular communication. Of course, these embodiments are merely exemplary and are not limiting or exhaustive.

Upon being started, the automated event management and analytics module 302 executes a process for providing an extensible architecture pattern that leverages data ingestion, data processing, and data resolution to facilitate automated event management. An exemplary process for providing an extensible architecture pattern that leverages data ingestion, data processing, and data resolution to facilitate automated event management is generally indicated at flowchart 400 in FIG. 4.

In the process 400 of FIG. 4, at step S402, indications that relate to an occurrence of an event may be received. The indication may include event data that details the event. In an exemplary embodiment, receiving of the indication may be part of a data ingestion process. The indication may relate to any piece of information that indicates and/or suggests that the event has occurred. For example, the indication may include event information that is received from an affected party.

In another exemplary embodiment, the event may relate to insignificant life events as well as significant life events. The event may include at least one from among a natural disaster event, a fraud event, a financial hardship event, an enlistment in the armed forces event, and an active duty event. The financial hardship event may further include at least one from among a destitute event and a bankruptcy event.

In another exemplary embodiment, to receive the indications, a graphical user interface may be generated to receive event information such as, for example, information that relates to a customer life event. The graphical user interface may relate to a form of user interface that enable interactions between users and electronic devices through various graphical icons and graphical devices. The graphical user interface may include graphical elements such as, for example, the graphical icons that are configured to receive an input from a user. For example, the graphical user interface may be utilized by a user to provide bankruptcy related information such as a confirmed bankruptcy status, an unconfirmed bankruptcy status, an in error bankruptcy status, a filing date, and case details. Similarly, the graphical user interface may be usable by another user to provide deceased related information such as a deceased status, a deceased date, and estate details.

Then, the graphical user interface may be displayed via a user device. The user device may include any computing device that is utilized by the user to interact with the graphical user interface such as, for example, a personal computing device or a mobile computing device. The graphical user interface may be automatically configured for optimized viewing based on the user device. For example, the graphical user interface may be automatically configured for viewing on a mobile device when the mobile device is detected as the user device. Thus, the indications may be received from the user via the graphical user interface.

In another exemplary embodiment, the graphical user interface may be designed to accommodate the receiving of additional information as needed based on the type of customer life event. To facilitate this accommodation, additional event information may be determined to be required based on the received indications and a corresponding event type. The event type may be automatically determined for each of the indications based on information extracted from the indications. For example, information extracted from the indication may provide that the life event relates to a financial-type event such as a bankruptcy.

Then, the graphical user interface may be modified to request the additional event information. The graphical user interface may be modified to update the graphical elements to include instructions for the user to provide the additional event information. For example, when the user indicates that the life event relates to a financial-type event, the graphical elements may be modified to provide instructions requesting additional case information related to final disposition of assets. The modified graphical user interface may be displayed via the user device consistent with present disclosures.

In another exemplary embodiment, to receive the indications, raw data may be aggregated from a plurality of sources. The raw data may correspond to authoritative information that may indicate a life event for various users. The authoritative information may be received from public sources such as, for example, government agencies as well as from private sources such as, for example, third-party data aggregators. For example, the authoritative information may include disaster proclamation data from a government agency for a geographical location.

Then, the raw data may be parsed to automatically identify a life event for affected users. For example, obituary data may be parsed to automatically identify deceased users. A model such as, for example, a machine learning model may be usable to facilitate automated identification of the life event. For example, machine learning and pattern recognition may be usable to identify a life event such as a marriage life event from name change information released by a government agency. The indication that is received by the extensible architecture may be automatically generated based on the identified life event consistent with present disclosures. The indication may include life event data such as, for example, the identified life event, the source information, and model information such as a confidence score.

In another exemplary embodiment, the model may include at least one from among a natural language processing model, a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S404, the event data may be parsed to generate event messages that correspond to the event. Each of the event messages may relate to a structured data set that is accessible within a network environment. In an exemplary embodiment, the structured data set may correspond to a predetermined data structure that is universally defined for usage by components of the network environment. The predetermined data structure may govern the organization of various data such as, for example, bankruptcy status data and bankruptcy filing data. In another exemplary embodiment, the event messages may include business event messages that are sharable in the network environment. For example, the business event messages may be accessible to all lines of business in an enterprise network environment.

In another exemplary embodiment, parsing of the event data to generate the event messages may be part of a data ingestion process. To facilitate the parsing of the event data, authoritative information may be aggregated from a plurality of sources. The authoritative information may be received from public sources such as, for example, government agencies as well as from private sources such as, for example, third-party data aggregators. For example, the authoritative information may include bankruptcy court information for various participants in bankruptcy proceedings. The authoritative information may include user information that may be trusted as being accurate or true.

Then, the event data may be verified based on a comparison with the corresponding authoritative information. The event data may be verified to confirm the accuracy of the provided information. Consistent with present disclosures, the comparison may be accomplished on an exact match basis and a partial match basis according to a predetermine guideline. Confirmation from an administrator may be required prior to final verification. For example, an administrator may provide final verification approval when a data item such as a name in a bankruptcy filing does not exactly match the corresponding name in the event data. The event message may be generated by using the verified event data.

At step S406, rules and corresponding triggers may be applied to accounts that are associated with the event. The rules and the corresponding triggers may be applied by using the event messages. In an exemplary embodiment, applying of the rules and corresponding triggers may be part of a data processing step. To facilitate the applying of the rules and corresponding triggers, accounts that are associated with the event may first be identified. The accounts may be identified based on an identifier such as, for example, a name and/or an account number of an event participant. The identification may be accomplished by computing components that are subscribed to the business event messages that detail the life events.

Then, rules and corresponding triggers that relate to the life events may be identified. The rules may be predetermined based on the type of life events according to guidelines such as, for example, business guidelines and regulatory guidelines. The corresponding triggers may relate to instructions that causes a necessary action to occur. For example, the rules may indicate that existing debts are forgiven as a result of a bankruptcy and a corresponding trigger may include instructions for actions to clear the existing debts from various ledgers. Consistent with present disclosures, the life event specific business rules may be applied to facilitate the triggering of required account treatment actions.

At step S408, resolution actions for each of the accounts may be initiated based on the associated rules and the corresponding triggers. In an exemplary embodiment, initiation of the resolution actions may be part of a treatment process. The life event specific business rules may be applied to facilitate the triggering of required account treatment actions such as, for example, the resolution actions. The resolution actions may include at least one from among a charge-off action and a write-off action to forgive debt based on the initiated actions.

In another exemplary embodiment, the resolution actions may be automatically initiated based on the associated rules and the corresponding triggers. The resolution actions may be automatically initiated without additional user input. For example, for certain life events, the resolution actions may be configured to automatically initiate. In another exemplary embodiment, the resolution actions may require additional administrative confirmation prior to initiation. The resolution actions may automatically request confirmation from a responsible administrator prior to modification of any accounts. For example, for certain life events, the resolution actions may be configured to automatically request confirmation prior to any ledger write-offs.

At step S410, resolution indicators that are associated with each of the accounts may be modified based on a result of the resolution action. In an exemplary embodiment, modifying resolution indicators may be part of a treatment process. The modifying of the resolution indicators may include at least one from a first action to add the resolution indicators based on a context of the event as well as a second action to remove the resolution indicators based on the context of the event. The resolution indicators may be added or removed from the accounts based on the customer level life event. The resolution indicators may be modified in context with the life event.

In another exemplary embodiment, services that are associated with each of the accounts may be identified. The services may relate to products which are required to comply with conditions that are associated with the accounts. For example, the products may relate to automated payment services for an account that must be stopped based on conditions that are associated with the account. The services may include at least one from among an automated payment service, a collections service, a marketing service, a specialist experience service related to personalizing administrative views across a platform, a customer experience service related to personalizing customer views across a platform, and a credit reporting service.

Then, requirements for each of the accounts may be determined based on the resolution indicator. Each of the requirements may relate to a regulatory obligation that must be satisfied based on a condition of the accounts. For example, a resolution indicator such as a deceased indicator may be usable to provide a condition of the account. The regulatory obligations may be automatically aggregated and maintained to facilitate identification of the requirements. For example, a management system for regulatory obligations may continuously update a repository of requirements when necessary to facilitate identification of the requirements.

Service resolution actions may then be initiated for each of the services based on the corresponding requirement. The service resolution actions may relate to actions that are usable to bring the services into compliance with the requirements. For example, an automated payment service may be required to stop according to a regulatory obligation when the account has a deceased indicator signifying that the account owner is deceased. When the resolution indicators indicate bankruptcy or decease, the service resolution actions may include at least one from among a stop payment action, a stop communications action, a marketing stop action, a labeling of accounts for specialist action, a hiding of accounts for customers action, and a credit bureau reporting action.

Figure 5:
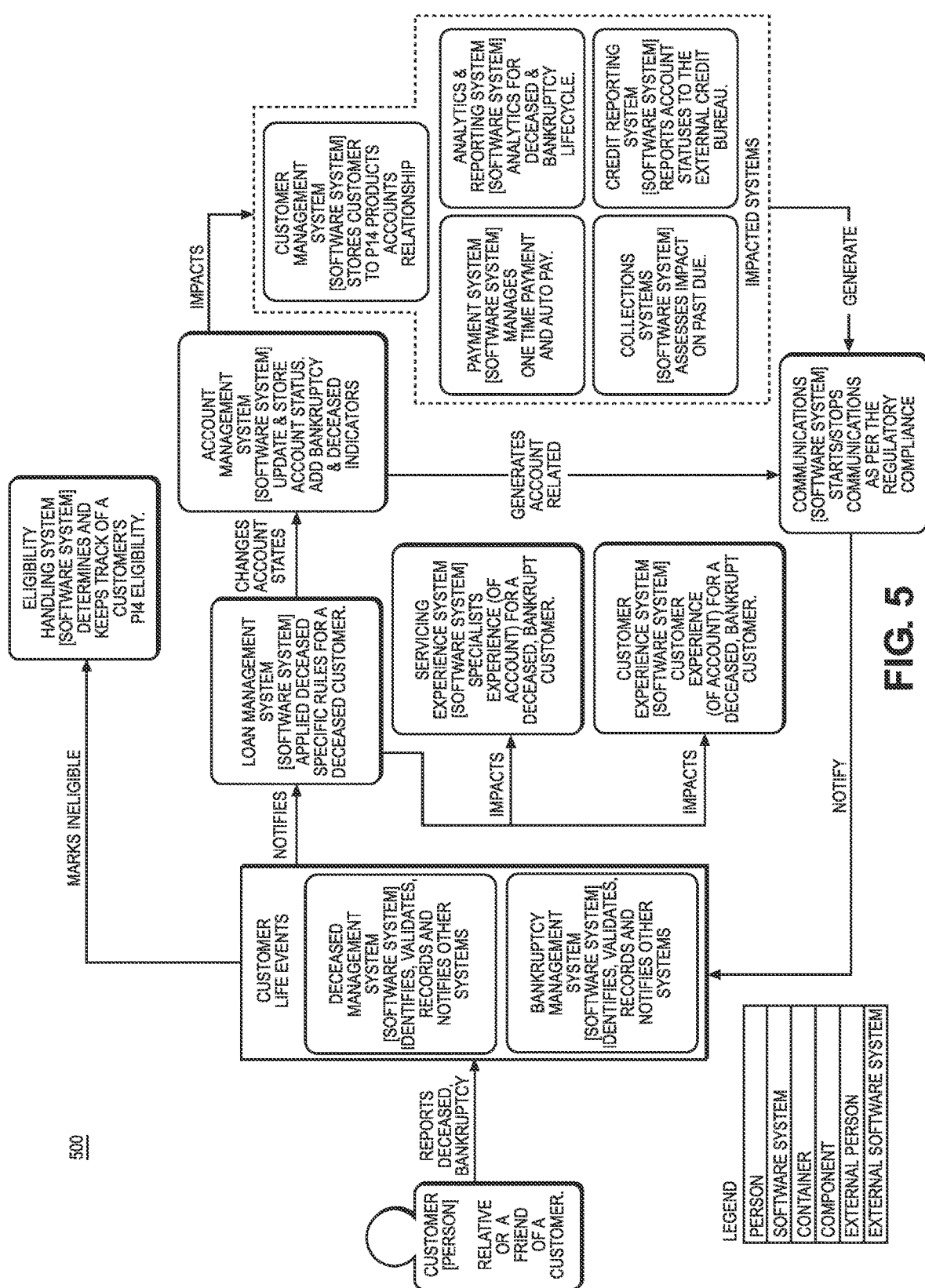
FIG. 5 is a system context diagram of an exemplary process for implementing a method for providing an extensible architecture pattern that leverages data ingestion, data processing, and data resolution to facilitate automated event management.

FIG. 5 is a system context diagram 500 of an exemplary process for implementing a method for providing an extensible architecture pattern that leverages data ingestion, data processing, and data resolution to facilitate automated event management. In FIG. 5, an extensible solution is provided to facilitate automated management of customer life events. The architecture pattern may facilitate the automated management in an ingestion stage, a processing stage, and a treatment stage.

As illustrated in FIG. 5, a customer may provide event information via a graphical user interface to report a life event. Management systems such as, for example, a deceased management system and a bankruptcy management system may notify a loan management system and mark an eligibility status in an eligibility handling system. The loan management system may determine impacts to a servicing experience system and a customer experience system.

The loan management system may also change account states in an account management system. The account management system may generate account related communications to notify the appropriate management systems. The account management system may also determine effects to impacted systems such as, for example, customer management systems, payment systems, collection systems, analytics and reporting systems, as well as credit reporting systems.

Figure 6:
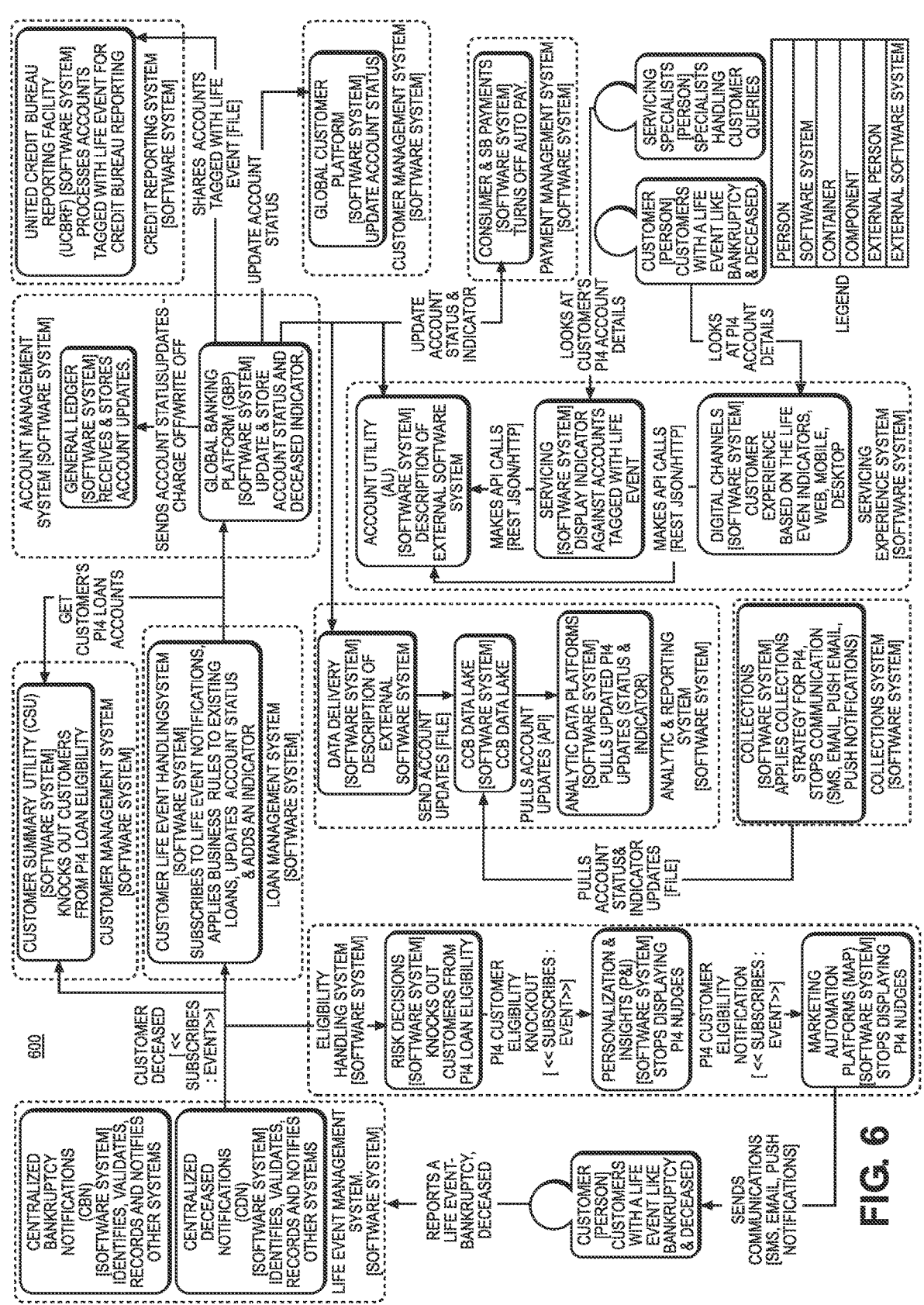
FIG. 6 is a container diagram of an exemplary process for implementing a method for providing an extensible architecture pattern that leverages data ingestion, data processing, and data resolution to facilitate automated event management.

FIG. 6 is a container diagram 600 of an exemplary process for implementing a method for providing an extensible architecture pattern that leverages data ingestion, data processing, and data resolution to facilitate automated event management. In FIG. 6, an extensible solution is provided to facilitate automated management of customer life events. The architecture pattern may facilitate the automated management in an ingestion stage, a processing stage, and a treatment stage.

As illustrated in FIG. 6, a customer may provide event information via a graphical user interface to report a life event. Notification systems such as, for example, centralized bankruptcy notification systems and centralized deceased notification systems may notify a customer management system, a loan management system, and an eligibility handling system. The loan management system may interact with an account management system to facilitate actions such as, for example, charge off actions and/or write-off actions. The eligibility handling system may send communications to the customer regarding an eligibility status.

The account management system may also share accounts tagged with life event to a credit reporting system. The account management system may update account statuses in a customer management system. The account management system may similarly update account statuses and indicators in a payment management system, a servicing experience system, as well as an analytics and reporting system.

Figure 7:
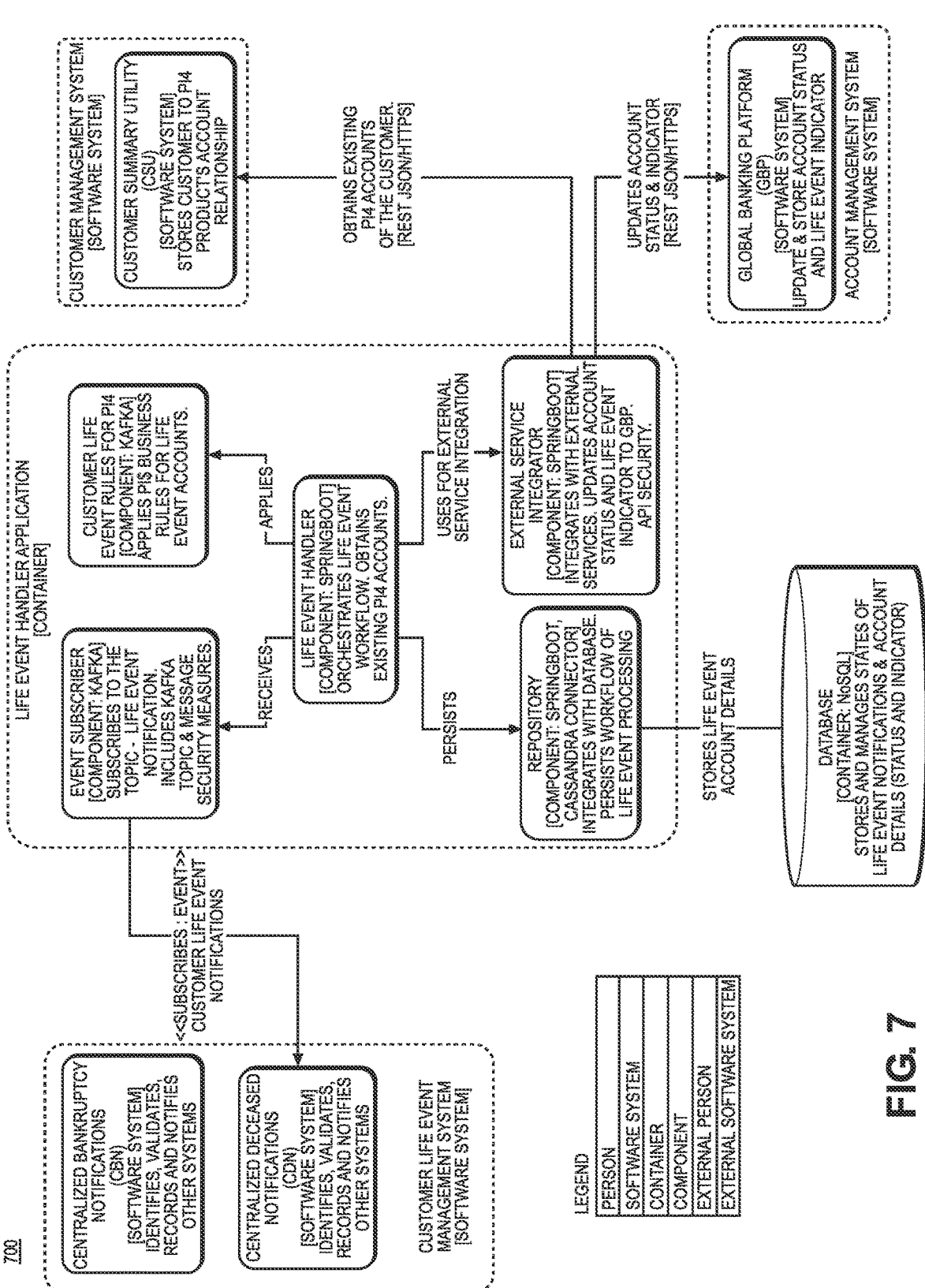
FIG. 7 is a component diagram of an exemplary process for implementing a method for providing an extensible architecture pattern that leverages data ingestion, data processing, and data resolution to facilitate automated event management.

FIG. 7 is a component diagram 700 of an exemplary process for implementing a method for providing an extensible architecture pattern that leverages data ingestion, data processing, and data resolution to facilitate automated event management. In FIG. 7, an extensible solution is provided to facilitate automated management of customer life events. The architecture pattern may facilitate the automated management in an ingestion stage, a processing stage, and a treatment stage.

As illustrated in FIG. 7, a customer life event management system may subscribe to a life event handler application for customer life event notifications. The life event handler application may include event subscriber components, customer life event rules components, repository components, and external service integrator components. The repository components may be usable to store life event account details in a database. The event subscriber component may manage subscriptions from the customer life event management system. The external service integrator component may interact with a customer management system to obtain existing accounts of the customer as well as interact with an account management system to update account statuses and indicators.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Accordingly, with this technology, an optimized process for providing an extensible architecture pattern that leverages data ingestion, data processing, and data resolution to facilitate automated event management is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an extensible architecture to facilitate automated event management, the method being implemented by at least one processor, the method comprising:

receiving, by the at least one processor, at least one indication that relates to an occurrence of a first event, the at least one indication including event data;

parsing, by the at least one processor, the event data to generate at least one event message that corresponds to the first event, each of the at least one event message relating to a structured data set that is accessible within a network environment, wherein the parsing includes aggregating authoritative information from a plurality of authoritative sources, and comparing the aggregated authoritative information with the event data to verify accuracy of the received at least one indication;

applying, by the at least one processor using the at least one event message, at least one rule and a corresponding trigger to at least one account that is associated with the first event;

initiating, by the at least one processor, at least one resolution action for each of the at least one account based on the at least one rule and the corresponding trigger; and modifying, by the at least one processor, at least one resolution indicator that is associated with each of the at least one account based on a result of the at least one resolution action.

2. The method of claim 1, further comprising:

identifying, by the at least one processor, at least one service that is associated with each of the at least one account;

determining, by the at least one processor, at least one requirement for each of the at least one account based on the at least one resolution indicator, each of the at least one requirement relating to a regulatory obligation; and initiating, by the at least one processor, at least one service resolution action for each of the at least one service based on the corresponding at least one requirement.

3. The method of claim 1, wherein the receiving of the at least one indication further comprises:

generating, by the at least one processor, a graphical user interface to receive event information, the graphical user interface including at least one graphical element that is configured to receive an input from a user;

displaying, by the at least one processor, the graphical user interface via a user device; and receiving, by the at least one processor, the at least one indication via the graphical user interface.

4. The method of claim 3, further comprising:

determining, by the at least one processor, that additional event information is required based on the at least one indication and a corresponding event type;

modifying, by the at least one processor, the graphical user interface to request the additional event information; and displaying, by the at least one processor, the modified graphical user interface via the user device.

5. The method of claim 1, further comprising:

aggregating, by the at least one processor, raw data from a plurality of sources;

parsing, by the at least one processor using at least one model, the raw data to automatically identify a second event; and generating, by the at least one processor, a second indication that relates to the second event, the second indication including second event data.

6. The method of claim 5, wherein the at least one model includes at least one from among a machine learning model, natural language processing model, a statistical model, a mathematical model, a process model, and a data model.

7. The method of claim 1, wherein the parsing of the event data further comprises:

generating, by the at least one processor, the at least one event message by using the verified event data.

8. The method of claim 1, wherein the modifying of the at least one resolution indicator includes at least one from among a first action to add the at least one resolution indicator based on a context of the first event and a second action to remove the at least one resolution indicator based on the context of the first event.

9. The method of claim 1, wherein the structured data set corresponds to a predetermined data structure that is universally defined for usage by at least one component of the network environment.

10. A computing device configured to implement an execution of a method for providing an extensible architecture to facilitate automated event management, the computing device comprising:

a processor;

a memory; and a communication interface coupled to each of the processor and the memory, wherein the processor is configured to:

receive at least one indication that relates to an occurrence of a first event, the at least one indication including event data;

parse the event data to generate at least one event message that corresponds to the first event, each of the at least one event message relating to a structured data set that is accessible within a network environment, wherein the parsing includes aggregating authoritative information from a plurality of authoritative sources, and comparing the aggregated authoritative information with the event data to verify accuracy of the received at least one indication;

apply, by using the at least one event message, at least one rule and a corresponding trigger to at least one account that is associated with the first event;

initiate at least one resolution action for each of the at least one account based on the at least one rule and the corresponding trigger; and modify at least one resolution indicator that is associated with each of the at least one account based on a result of the at least one resolution action.

11. The computing device of claim 10, wherein the processor is further configured to:

identify at least one service that is associated with each of the at least one account;

determine at least one requirement for each of the at least one account based on the at least one resolution indicator, each of the at least one requirement relating to a regulatory obligation; and initiate at least one service resolution action for each of the at least one service based on the corresponding at least one requirement.

12. The computing device of claim 10, wherein, to receive the at least one indication, the processor is further configured to:

generate a graphical user interface to receive event information, the graphical user interface including at least one graphical element that is configured to receive an input from a user;

display the graphical user interface via a user device; and receive the at least one indication via the graphical user interface.

13. The computing device of claim 12, wherein the processor is further configured to:

determine that additional event information is required based on the at least one indication and a corresponding event type;

modify the graphical user interface to request the additional event information; and display the modified graphical user interface via the user device.

14. The computing device of claim 10, wherein the processor is further configured to:

aggregate raw data from a plurality of sources;

parse, by using at least one model, the raw data to automatically identify a second event; and generate a second indication that relates to the second event, the second indication including second event data.

15. The computing device of claim 14, wherein the at least one model includes at least one from among a machine learning model, natural language processing model, a statistical model, a mathematical model, a process model, and a data model.

16. The computing device of claim 10, wherein, to parse the event data, the processor is further configured to:

generate the at least one event message by using the verified event data.

17. The computing device of claim 10, wherein the modifying of the at least one resolution indicator includes at least one from among a first action to add the at least one resolution indicator based on a context of the first event and a second action to remove the at least one resolution indicator based on the context of the first event.

18. The computing device of claim 10, wherein the structured data set corresponds to a predetermined data structure that is universally defined for usage by at least one component of the network environment.

19. A non-transitory computer readable storage medium storing instructions for providing an extensible architecture to facilitate automated event management, the storage medium comprising executable code which, when executed by a processor, causes the processor to:

receive at least one indication that relates to an occurrence of a first event, the at least one indication including event data;

parse the event data to generate at least one event message that corresponds to the first event, each of the at least one event message relating to a structured data set that is accessible within a network environment, wherein the parsing includes aggregating authoritative information from a plurality of authoritative sources, and comparing the aggregated authoritative information with the event data to verify accuracy of the received at least one indication;

apply, by using the at least one event message, at least one rule and a corresponding trigger to at least one account that is associated with the first event;

initiate at least one resolution action for each of the at least one account based on the at least one rule and the corresponding trigger; and modify at least one resolution indicator that is associated with each of the at least one account based on a result of the at least one resolution action.

20. The storage medium of claim 19, wherein, when executed by the processor, the executable code further causes the processor to:

identify at least one service that is associated with each of the at least one account;

determine at least one requirement for each of the at least one account based on the at least one resolution indicator, each of the at least one requirement relating to a regulatory obligation; and initiate at least one service resolution action for each of the at least one service based on the corresponding at least one requirement.

* * * * *